United States Patent [19]
Birrell et al.

[11] Patent Number: 5,757,997
[45] Date of Patent: May 26, 1998

[54] OPTICAL FIBER CONNECTOR USING FIBER SPRING FORCE ALIGNMENT GROOVE

[75] Inventors: Barbara L. Birrell; Victor J. Borer, both of Austin; Donald G. Doss, Round Rock, all of Tex.; Gordon D. Henson, Lake Elmo; Scott A. Igl, St. Paul, both of Minn.; Nicolas A. Lee, Woodbury, Minn.

[73] Assignee: Minnesota Mining and Manufacturing Company, St. Paul, Minn.

[21] Appl. No.: 577,740

[22] Filed: Dec. 22, 1995

[51] Int. Cl.⁶ .................................................. G02B 6/38
[52] U.S. Cl. ............................. 385/60; 385/62; 385/65; 385/70; 385/98
[58] Field of Search .................... 385/55, 56, 57, 385/58, 60, 65, 72, 75, 76, 78, 83, 97, 98, 99, 19, 25, 139, 140, 134, 135

[56] References Cited

U.S. PATENT DOCUMENTS

| | | | |
|---|---|---|---|
| 3,919,037 | 11/1975 | Miller | 385/98 |
| 4,028,162 | 6/1977 | Cherin et al. | 156/158 |
| 4,045,121 | 8/1977 | Clark | 385/58 |
| 4,077,702 | 3/1978 | Kunze et al. | 385/70 X |
| 4,135,783 | 1/1979 | Kunze | 385/65 |
| 4,148,559 | 4/1979 | Gauthier | 385/55 |
| 4,218,113 | 8/1980 | Uberbacher et al. | 385/72 |
| 4,277,135 | 7/1981 | Schrott et al. | 385/75 |
| 4,322,127 | 3/1982 | Comerford et al. | 385/65 |
| 4,756,591 | 7/1988 | Fischer et al. | 385/88 |
| 4,767,180 | 8/1988 | Zajac et al. | 385/62 |
| 4,834,482 | 5/1989 | Campbell et al. | 385/32 |
| 4,834,488 | 5/1989 | Lee | 385/57 |
| 5,080,461 | 1/1992 | Pimpinella | 385/65 |
| 5,151,964 | 9/1992 | Carpenter et al. | 385/98 |
| 5,348,487 | 9/1994 | Marazzsi et al. | 385/78 |
| 5,381,498 | 1/1995 | Bylander | 385/83 |
| 5,392,373 | 2/1995 | Essert | 385/92 |
| 5,497,439 | 3/1996 | Piffaretti et al. | 385/98 |
| 5,500,911 | 3/1996 | Roff | 385/33 |

FOREIGN PATENT DOCUMENTS

| | | | |
|---|---|---|---|
| 546 936 A1 | 6/1993 | European Pat. Off. | G02B 6/38 |
| 2 696 841 | 4/1994 | European Pat. Off. | G02B 6/38 |
| 2660442 | 4/1991 | France | G02B 6/36 |
| 4008483 A1 | 9/1981 | Germany | G02B 6/26 |
| 3508627 A1 | 3/1985 | Germany | G02B 6/42 |
| 55132076 | 10/1980 | Japan | H01L 31/02 |
| 58090607 | 5/1983 | Japan | G02B 7/26 |

Primary Examiner—Rodney B. Bovernick
Assistant Examiner—Hemang Sanghavi
Attorney, Agent, or Firm—Gerald F. Chernivec; John C. McFarren

[57] ABSTRACT

A fiber optic connector comprising a plug and a receptacle uses the spring force supplied by bowing of the plug fiber to maintain a continuous compressive load at the fiber joint located in a fiber-alignment groove. The plug has a holder for securing the plug fiber and a shroud which snaps onto the holder with the plug fiber extending generally straight inside the shroud. The shroud has a slot providing access to the terminal portion of the plug fiber, and a sliding door which selectively covers the slot. The receptacle includes a housing and another fiber holder for securing the receptacle fiber, with a projection or finger attached to the receptacle fiber holder, the projection having the fiber-alignment groove. The finger is oriented within the receptacle housing such that, when the plug is inserted into the receptacle, the finger extends through the slot in the shroud at an oblique angle with respect to the plug axis. In this manner, as the plug is inserted, the end of the plug fiber slides into the fiber-alignment groove in the finger and comes into contact with the end face of the receptacle fiber. Continued insertion results in bowing of the plug fiber to achieve the compressive load. The plug door may have camming surfaces which are actuated by corresponding surfaces on a door of the receptacle. The connector may be used to simultaneously interconnect a plurality of fiber pairs, or to terminate a fiber to an active optical device.

18 Claims, 8 Drawing Sheets

OPTICAL FIBER CONNECTOR USING FIBER SPRING FORCE ALIGNMENT GROOVE

BACKGROUND OF THE INVENTION

1. Field of the Invention

The present invention generally relates to devices for connecting a telecommunications line (including voice, data, video, etc.) to another line or to a terminal, and more particularly to a device for interconnecting at least one optical fiber with another optical fiber or with an optoelectronic component.

2. Description of the Prior Art

Optical fibers have replaced copper wire as the preferred medium for carrying telecommunications signals. As with copper wire, it is necessary to provide for the interconnection of optical fibers, during installation, repair or replacement of the fibers, and to terminate the fibers onto active optical devices. There are generally two kinds of interconnection devices, splices and connectors. The term "splice" usually refers to a device which provides a permanent connection between a pair of optical fibers. The term "connector," in contrast, usually refers to a device which may be engaged and disengaged repeatedly, often with a different plug or receptacle. A connector may also refer to the plug portion of a fiber termination, which is attached to an optical device. Optical devices include, for example, optical sensors (photoelectric diodes) and light sources (LED's, laser diodes). The termination of an optical fiber may be indirect, i.e., the fiber may be connected to some other (passive) optical device such as a beam splitter or polarizer, before the light beam is directed to the active optical device. The present invention is generally directed to a connector, although this term should not be construed in a limiting sense since the present invention may inherently provide a permanent, as well as temporary connection or termination.

In the fiber optic connector described in U.S. Pat. No. 5,381,498, the connector has a plug and a receptacle, the plug having a fiber-receiving, V-shaped groove for each fiber to be interconnected, with the end of the fiber terminating in the middle of the groove. The receptacle has a plate which retracts as the plug is inserted, whereby another fiber is lowered into the V-groove of the plug. Upon full insertion of the plug, the two fibers ends are in contact, and the fiber secured to the receptacle is elastically deformed to maintain a continuous compressive load between the terminal ends of the fibers. The connector provides for the quick disconnection and reconnection of a plurality of optical fiber pairs, without the use of ferrules or other alignment members. High strength fiber may be used to withstand repeated insertions and bowing of the fibers. The exact lengths of fibers (i.e., the relative locations of their terminal ends in the plug and receptacle) are not critical since tolerance is provided by the slack taken up in the bowed receptacle fiber (the terminal portion of the fiber secured to the plug does not bow, but always remains straight). The ends of the fibers may be prepared by simply cleaving and beveling; the end faces may optionally be cleaved at an angle (i.e., non-orthogonal to the fiber axis) to reduce signal reflections.

Many fiber optic splices employ plate elements having fiber-receiving grooves, with means for clamping the terminal ends of the fibers in a common groove. Some of these devices are designed to interconnect a plurality of pairs of fibers, such as the splice shown in U.S. Pat. No. 5,151,964. In U.S. Pat. No. 4,028,162, fibers approach alignment grooves at a glancing angle and are held temporarily while a connector plate is adhered to the interconnected fibers. For other examples of techniques involving bowed fibers entering alignment grooves, see U.S. Pat. Nos. 4,077,702, 4,148,559, 4,322,127 and 5,080,461, and French Patent Application No. 2,660,442. Some of the connector designs using the principle of bowing a fiber into a fiber-alignment groove are rather complex and require many parts, such as the designs seen in U.S. Pat. Nos. 4,045,121, 4,218,113 and 4,767,180.

The connector in the '498 patent makes use of this fiber bowing principle, but suffers certain other disadvantages. For example, the plug design allows dust to easily settle on the tips of the fibers, since these tips are exposed above the fiber-receiving grooves. Fibers in the receptacle may similarly become contaminated since there is no door or other means to close off the opening when the plug is not present. While the '498 connector has fewer parts than most ferrule connectors, it would still be preferable to eliminate the moving parts, such as the sliding plate and spring inside the receptacle. That design also recommends the use of high-strength fibers in the socket, making it less compatible with an embedded base of standard fiber. It would, therefore, be desirable and advantageous to devise a fiber optic connector which similarly provides for the quick disconnection and reconnection of a plurality of optical fiber pairs, and which is simple to install and use, but further overcomes the foregoing limitations without sacrificing performance or cost.

SUMMARY OF THE INVENTION

The present invention provides an optical fiber connector generally comprising a plug having at least one fiber terminating therein, releasably attached to a receptacle which may have another fiber secured therein, or which may house an active optical component. The plug includes a fiber holder securing a terminal portion of an optical fiber, and an elongate, hollow plug body having first and second ends, the first end being open and attached to the plug fiber holder with the terminal portion of the plug fiber extending into an interior of the plug body, the interior having sufficient space to allow the terminal portion of the plug fiber to bow, and the second end having a slot providing access to the terminal portion of the fiber. The receptacle has an opening sized to receive said second end of said plug body, and a projection or finger adapted to enter the slot in the plug body at an oblique angle with respect to the plug body axis. The finger has a fiber-alignment groove therein, located to receive the terminal portion of the plug fiber when the plug body is inserted in the receptacle. In the embodiment for fiber-to-fiber interconnection, the receptacle further has a receptacle fiber holder securing a terminal portion of another optical fiber whose end face is located along an intermediate section of said fiber-alignment groove. The receptacle fiber may be retained properly in the groove by a fiber hold-down. In the embodiment for termination to an electro-optic device, the finger is attached to a base having a fiber stop. In either embodiment, the plug fiber extends generally straight within the plug body when the plug is removed from the receptacle, but the plug fiber is sufficiently long such that, when the plug is fully inserted in the receptacle, the plug fiber becomes bowed to maintain a continuous compressive load against either the end face of the receptacle fiber, or the fiber stop. The bending of the plug fiber also maintains the fiber firmly nested in the fiber-alignment groove.

First latch means are provided for releasably securing the plug body in the receptacle, and second latch means are provided for releasably mounting the receptacle on a support surface. The first latch means may be formed in an extension or landing of the plug fiber holder. This landing may also have upstanding posts which extend into the interior of the plug body to limit skewing of the terminal portion of the plug fiber. The plug may be biased in the interconnected position to be pushed back against the first latch means to minimize the effect of manufacturing tolerances.

The plug body may further include a plug door, slidable between a closed position wherein the plug door covers the slot and an open position wherein the slot is unobstructed by the plug door. The plug door may have camming surfaces adapted to urge the door member sideways, and the receptacle may have a door with corresponding camming surface adapted to cam against the camming surfaces of the plug door upon insertion of said plug body in said receptacle.

The connector may be quickly engaged and disengaged, and is easy to install. The design may be adapted to provide for the interconnection of a plurality of pairs of optical fibers.

BRIEF DESCRIPTION OF THE DRAWINGS

The invention will best be understood by reference to the accompanying drawings, wherein.

DESCRIPTION OF THE PREFERRED EMBODIMENT

Figure 1:
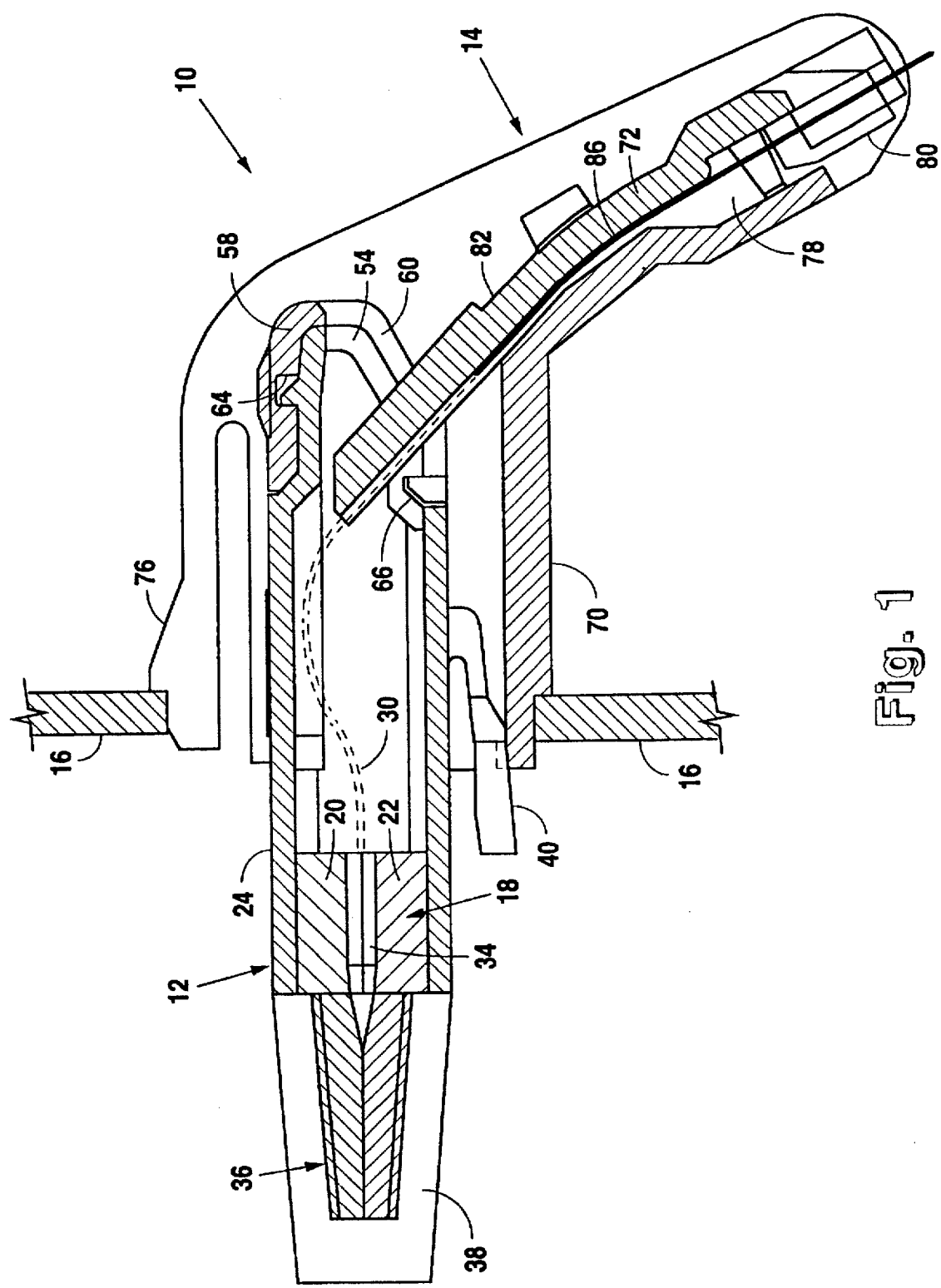
FIG. 1 is a side view of a longitudinal section of one embodiment of the present invention, depicting a fiber optic connector including a plug and receptacle.
Figure 2:
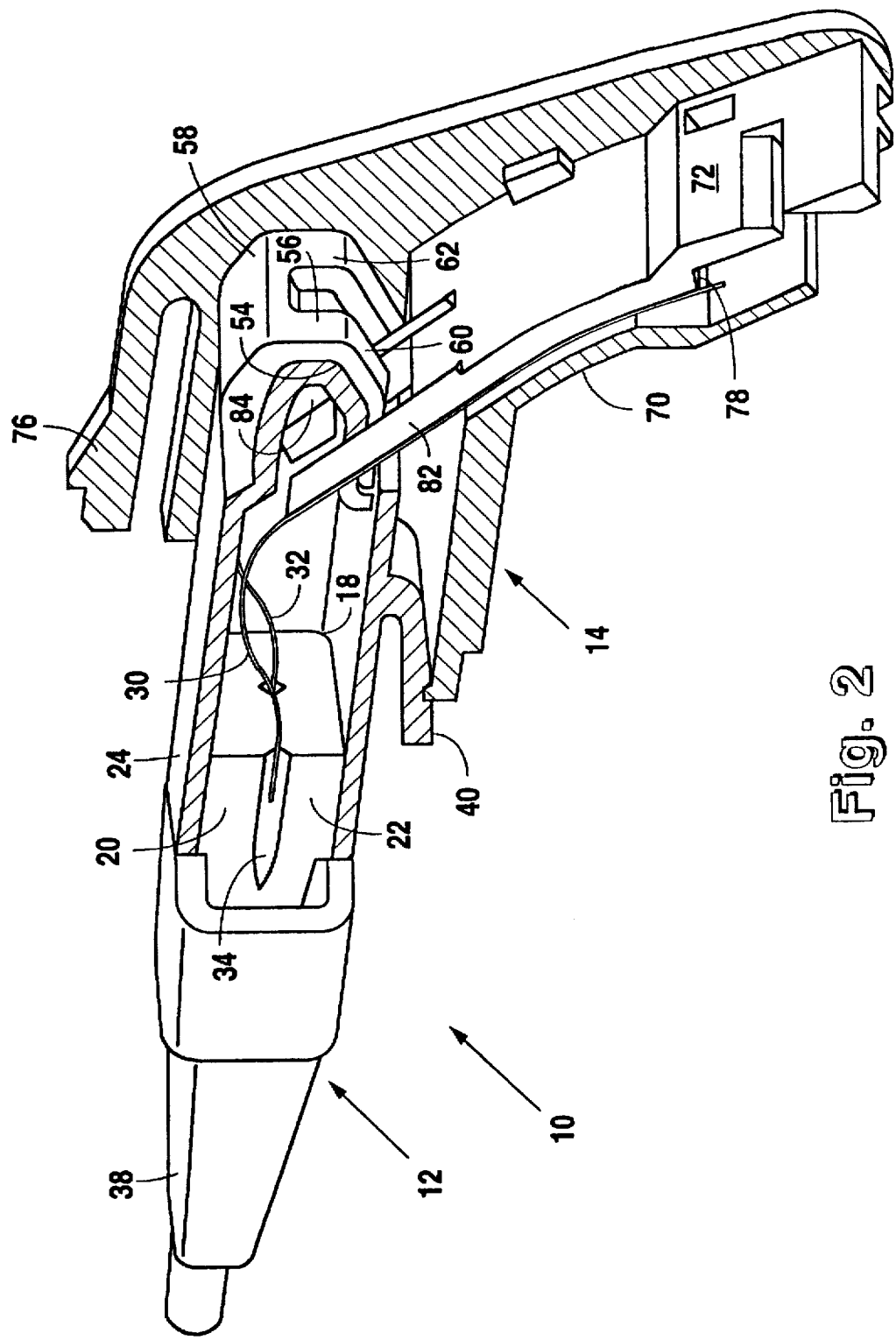
FIG. 2 is a perspective view of the plug and receptacle of FIG. 1, with a partial section revealing the bowed fibers in the plug interior.

With reference now to the figures, and in particular with reference to FIGS. 1 and 2, there is depicted one embodiment 10 of the fiber optic connector of the present invention. Connector 10 is generally comprised of an elongate plug 12 and a socket or receptacle 14. FIG. 1 is a longitudinal section of connector 10 showing plug 12 fully inserted in receptacle 14, and receptacle 14 mounted on a support surface or bulkhead 16. FIG. 2 is a perspective view with bulkhead 16 omitted, also with a partial longitudinal section to illustrate the interior of the connector. The depicted embodiment provides for the interconnection of two pairs of fibers, but those skilled in the art will appreciate that the inventive concepts described herein extend to single pair interconnection as well as interconnection of a multiplicity of pairs.

Figure 3:
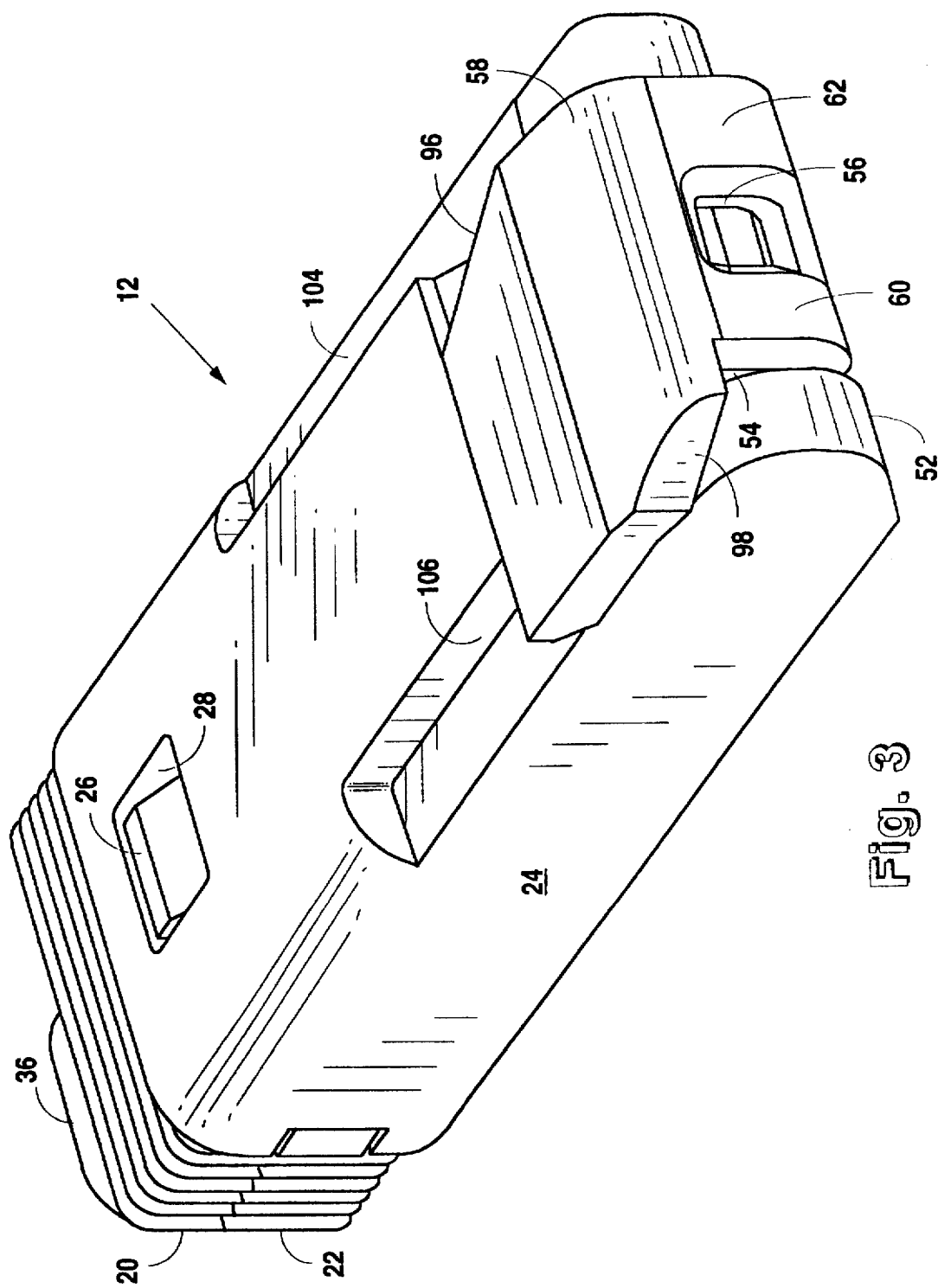
FIG. 3 is a perspective view of one embodiment of the plug used with the present connector, with a sliding door.

Plug 12, shown also in FIG. 3, includes a fiber holder 18 which may be constructed of two clamping elements or blocks 20 and 22, and a plug body or shroud 24 which is attached to fiber holder 18. Shroud 24 may be removably attached to plug fiber holder 18 by means of, e.g., latches 26 integrally molded onto blocks 20 and 22, which engage cutouts 28 formed in corresponding walls of shroud 24. Fibers 30 and 32 which are to be interconnected or terminated pass through holder 18 and into the hollow interior of shroud 24. The terminal portions of the fibers are bare, that is, they are not affixed to any alignment member such as a ferrule. Shroud 24 therefore serves not only to assist in physically locating plug 12 in receptacle 14, but also to provide protection for the otherwise exposed terminal portions of the fibers (the shroud could be made retractable to fully expose the fiber tips, if required). Holder 18 has fiber-receiving grooves 34 formed in the adjacent surfaces of blocks 20 and 22; these two components may be identical parts. Holder 18 may secure the fibers, for example, by clamping, adhesives or both. Alternative means may be used to secure the fibers to holder 18. Holder 18 may have an extension 36 surrounding the fibers for additional strain relief and clamping. A boot 38 may be provided for further strain relief and capturing of the strengthening members in the fiber cable (KEVLAR strands), and to assist in handling plug 12. The strengthening members need not be crimped but they may be adhered onto the holder. Strain relief of the strengthening members is attained by a force fit of straight-wall section of the plug fiber holder within the boot. This is dependent upon the choice of materials used for the boot and the plug fiber holder, and yields a design that does not require a crimp ring and which assists in ease of manufacture and reduces the number of needed components. Alternatively, an extension may be formed on the holder with a "torture" (irregular) path for clamping the strands and retaining the boot with an interference fit. "One-way" barbs on the surface of the plug fiber holder assist in the attachment of the boot to the plug fiber holder, which also assists in the attachment of the cable to the plug.

In the embodiment of FIGS. 1 and 2, a latch 40 is integrally molded onto one side of shroud 24 to releasably secure plug 12 to receptacle 14. Latch 40 also imparts mechanical polarization to the plug, i.e., it can only be inserted into receptacle 14 in one orientation. Plug 12 may be biased in the interconnected position, e.g., by a springboard (a flexible cantilever) formed inside receptacle 14, to be pushed back against latch 40 to minimize the effect of manufacturing tolerances.

Figure 4:
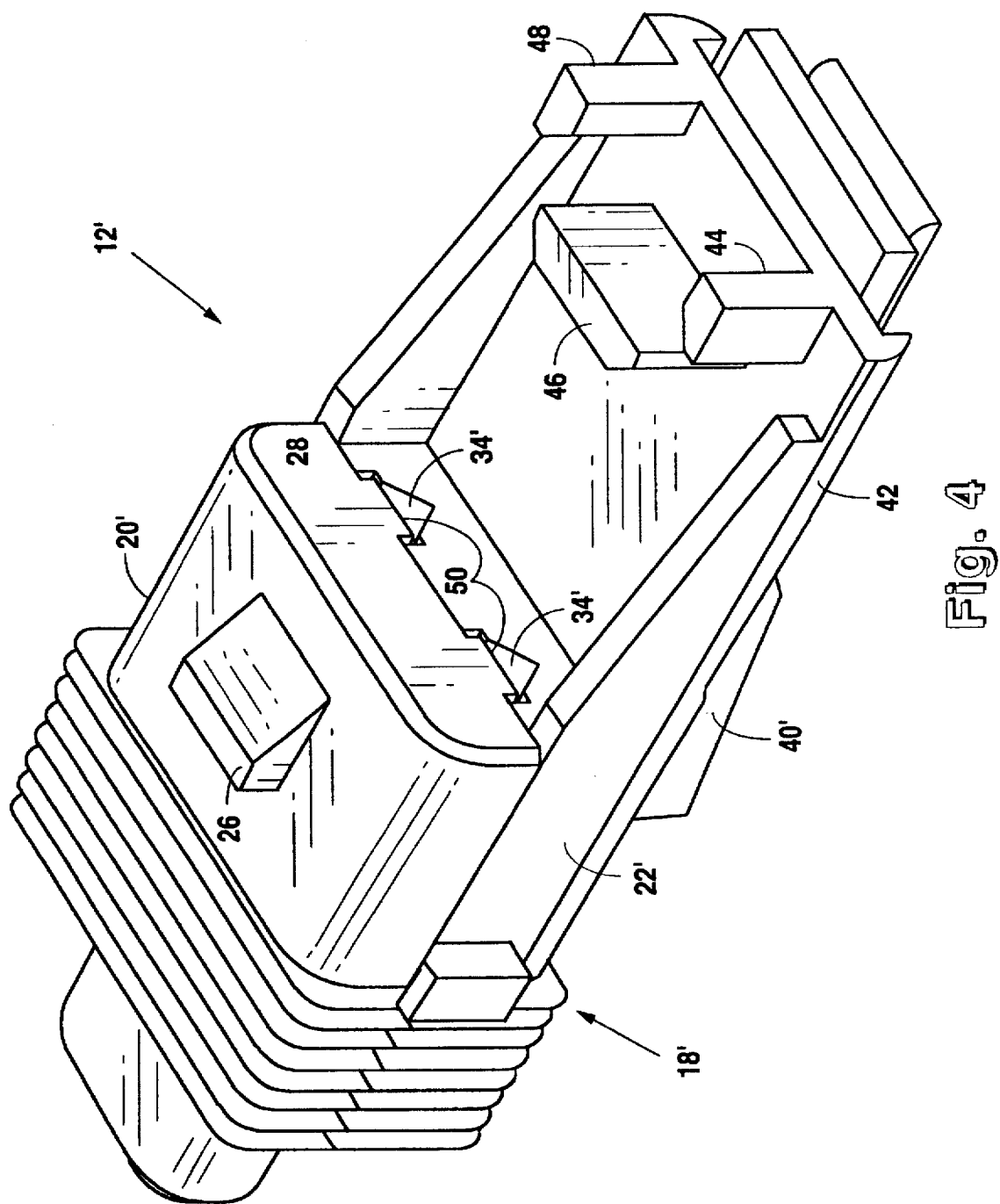
FIG. 4 is a perspective view of another embodiment of the plug used with the present connector, with the plug shroud omitted to reveal interior details.

FIG. 4 depicts a slightly different embodiment 12' of a plug usable with the connector of the present invention. This embodiment employs a similar shroud, which is omitted from FIG. 4 to better illustrate the alternative fiber holder 18' and interior features. Holder 18' is again formed from two blocks 20' and 22', but those two blocks are not identical in this embodiment. First, block 22' has an extension or landing 42 which has several upstanding posts 44, 46 and 48. These posts serve to guide the fibers within shroud 24 in proper position for location in the V-grooves of receptacle 14 as discussed further below, and limit skewing of the fibers, ensuring proper alignment of the fiber tips with openings in shroud 24. Latch 40' is molded into block 22', along the underside of landing 42. Second, the fiber passageways in holder 18' are formed by providing V-shaped grooves 34' only in block 22', with the corresponding surface of block 20' being flat to provide only three fiber-clamping surfaces. V-grooves 34' are further recessed in block 22', and steps 50 are formed on block 20' which seat in the recesses and facilitate proper attachment of the blocks together.

Fibers 30 and 32 extend generally straight within shroud 24 whenever plug 12 (or plug 12') is not installed in receptacle 14. The fibers are "generally" straight in that they extend without significant bowing, although there might be some minute flexing of the fibers as a result of gravity. Sufficient space is provided within shroud 24, however, to allow the fibers to bow significantly, as seen in FIGS. 1 and 2, when the plug is fully inserted into the receptacle. The forward end 52 of shroud 24 has a pair of slots 54 and 56 formed therein which provide access to the terminal ends of the fibers located within shroud 24. A hood or door 58 is slidably attached to forward end 52 of shroud 24, with two covers or bars 60, 62 which overlap slots 54 and 56, respectively, when door 58 is in the closed position of FIG. 3. When door 58 slides to the open position, bars 60 and 62 move to allow access to fibers 30 and 32 via slots 54 and 56, respectively, without the need for the fibers to extend outside of shroud 24, although this would be acceptable in alternative designs. Door 58 is slidably attached to shroud 24 with a snap fit resulting from two tongue-and-groove arrangements 64 and 66 (FIG. 1). In addition to preventing dust from entering through the slots, door 58 also prevents any light in the plug fibers from escaping and injuring a user's eyes. As discussed below in conjunction with FIG. 8, door 58 may also reveal, in the open position, one or more holes on the top of shroud 24 which may receive push rods to tip the fibers out openings 54 and 56 to allow cleaning of the fiber tips.

Other door arrangements may be provided for the plug. For example, it could have a door (not pictured) which raises vertically during the plug insertion process. This is accomplished by having the door sit in another part, such as a shuttle, that moves within the shroud body. The shuttle has a vertical slot on each of its side walls, and is open across each end. The solid door has a post that protrudes past the side walls of the shuttle, and into slots that exist in the shroud which have the following shape. Each of the slots starts at an upward angle (about 30°) for about 1 mm, then becomes horizontal for the majority of the distance, then rises again about 1 mm, and finishes with a second horizontal track (about 1.5 mm). When the plug comes into contact with a stop in the receptacle, it pushes the shuttle back within the shroud. During the first few millimeters of travel, the door is raised to its first position. In this position the fibers come in contact with the door, which deflects the fibers down at an obtuse angle, although this is not necessary. The door can also act as an alignment mechanism. This helps prevent end face contact of the plug fibers with the V-groove when they come into contact with the V-groove. Before the plug reaches full insertion, the shuttle reaches the second angled slot in the shroud. At this time the door is lifted to its final position, in which the door is no longer in contact with the fibers so that they are free to bow and provide adequate pressure on the receptacle. Returning of the shuttle and door is accomplished by a spring that pushes between the fiber holder and the shuttle. The particular advantage of this design is that it exposes the entire end of the plug, without any slot that the fibers must feed through to come into contact with the V-grooves.

In another door arrangement (not shown), the door slides across the plug during the insertion process, again using a shuttle that moves within the shroud body. The shuttle has a vertical slot on each of its side walls and is open across the end nearest the fiber holder. The end nearest the front of the shroud has an enclosed end with two vertical slots that are in line with the fibers, running from top to bottom. The door is nothing more than a rectangular plate, having two vertical slots that run from its bottom to about two material thicknesses from its top. Also, it has a notch cut in its top that rides in a ridge in the shroud. This ridge acts as the camming mechanism for the door. The cam is located on the inside of the roof of the shroud. From the front it starts at an obtuse angle until it reaches the center, where it runs down the length of its body. In the closed position the two sets of slots in the shuttle and door are offset from each other, providing a closed plug. When the plug comes into contact with a stop in the receptacle, it pushes the shuttle back within the shroud. During the first few millimeters of travel, the door slides sideways within the shroud at the same time the shuttle is moving backward. Once the two sets of slots are in line, providing an open slot for the fiber to exit through, the door has reached the straight section of the cam. At this point the door stops moving sideways and is carried back within the shroud by the shuttle. Returning of the shuttle and door is accomplished by a spring that pushes between the fiber holder and the shuttle. This design also exposes the entire end of the plug, and provides for smooth operation of the door.

Variations of the plug design of the present invention will become apparent to those skilled in the art upon reference to the foregoing description. For example, a plug may be used (not shown) in which the primary differentiation is the manner of delivery of the plug fibers into the V-grooves of the receptacle. This alternative plug design has a body with two distinct parts, a body which mates with the socket, and a boot which is connected to the body by a hinge. The hinge allows the plug body and boot to lie at a 180° angle (i.e., extend straight) when the plug is inserted into the socket. The boot is then rotated down so the angle between the body and boot becomes less than 180°. This forces the plug fibers out of the protective plug body and into the receptacle V-grooves. This design may further be adapted into a plug which is not hinged, but rotational movement is still used to move the plug fibers into the receptacle V-grooves. The V-grooves do not need to feed through the slots. These designs also allow the plug boot to lie flush against the wall and do not require the receptacle V-grooves to enter the shroud, and the longer plug fiber and greater rotational angle provide for additional manufacturing and assembly tolerances.

A test plug may also be used to test the operation of the receptacle. This plug would be essentially identical to the previously described plug, except that it receives a single fiber looped to have both ends extending toward the receptacle. In this manner, a signal may be sent down one of the receptacle fibers, received by the loop-back fiber in the plug, and then rerouted to the other receptacle fiber, which carries the signal to a test detection system.

Figure 5:
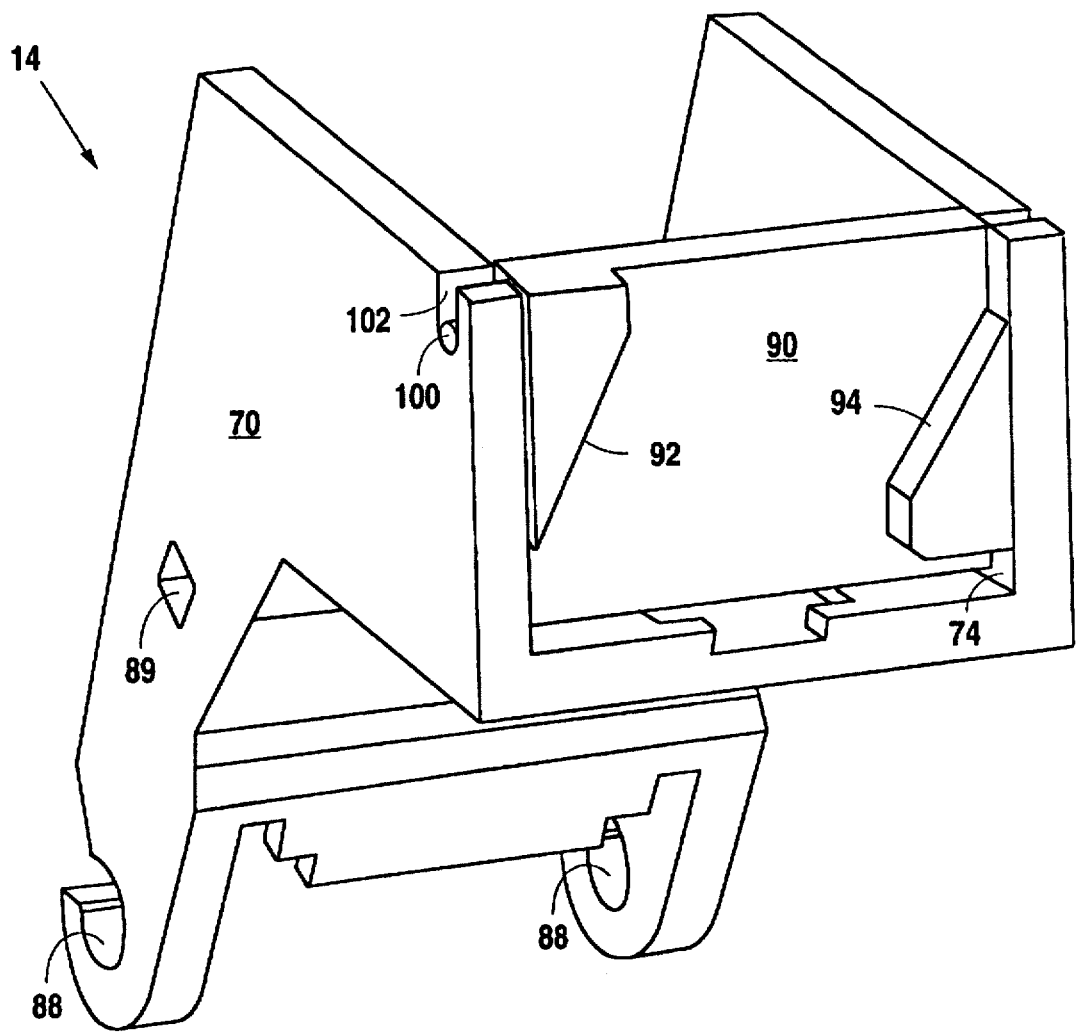
FIG. 5 is a perspective view of one embodiment of the receptacle used with the present connector, with a hinged door having camming surfaces which cooperate with camming surfaces on the plug door.

Receptacle 14, also shown in FIG. 5, includes a body or housing 70 and another fiber holder 72. Housing 70 has an opening 74 whose size and shape generally corresponds to that of the forward end 52 of plug 12. Housing 70 may also have appropriate features (such as latch arms 76) allowing it to be releasably mounted to bulkhead 16 which may be, for example, a patch panel or workstation outlet (wall box faceplate). The latch means may provide for mounting from the front of the panel, to allow all preparatory work to be done at the front side of the panel, or may provide for mounting from the rear of the panel, to allow all preparatory work to be done at the back side of the panel. The receptacle fibers (only one of which, 78, is visible in FIGS. 1 and 2) are secured to receptacle fiber holder 72 by clamping as well, using a clamping plate 80 adapted to grip the fibers at a first end of holder 72. The terminal ends of the receptacle fibers extend into fiber-alignment grooves formed in projections or fingers 82 and 84 at a second end of receptacle fiber holder 72. The grooves are preferably V-shaped, although they may be more rounded, i.e., U-shaped. An intermediate section 86 of the fiber-alignment grooves is curved so as to maintain the receptacle fibers in the grooves by the elastic urging of the slightly bowed fibers. Additional means may be provided, such as the fiber hold-down shown in FIG. 9, to retain the fibers firmly in the grooves. The fibers do not extend to the very tips of fingers 82 and 84 but rather terminate a sufficient distance from the tips to allow proper support of the plug fibers when the connector is in use. If the fiber-to-fiber contact occurs very near the tips of the V-grooves (or if the plug is inserted too far), the plug fiber can bend beyond the groove and lifted away from the apex, breaking the connection.

Receptacle 14 may have as many of these fingers with fiber-alignment grooves as there are fibers in plug 12. Fingers 82 and 84 are shaped to project into slots 54 and 56, respectively, of shroud 24 when plug 12 is fully inserted into receptacle 14. Fingers 82 and 84 enter shroud 24 at an oblique (nonzero) angle with respect the plug axis, i.e., the axis defined by either of the plug fibers 30 or 32 when they are extending straight within shroud 24. This angle is preferably about 42°, which balances concerns regarding fiber end face contact pressure, fiber forces directed into the V-groove, the effects of friction, and the desired tolerance window (a larger angle increases tolerances). Since the receptacle fibers are not directed toward opening 74, there is no danger of escaping light injuring a user's eyes. Receptacle fiber holder 72 is pivotally attached to housing 70 by providing posts on the first end of holder 72 which snap into cutouts or hooks 88 formed at one end of receptacle housing 70. Holder 72 releasably locks into place using bumps or studs formed on the side of the holder, which engage holes 89 in receptacle housing 70. An alternative design for the receptacle fiber holder may be used in which the holder is molded as a single piece with a breakaway top or cover plate that can snap onto its base, the base having the fiber-positioning grooves.

Receptacle 14 may also have a flap or door 90 to minimize entry of contaminants through opening 74. The disclosed embodiment uses a receptacle door which cooperates with the plug door to actuate plug door 58 between closed and open states as plug 12 is inserted into receptacle 14. Specifically, receptacle door 90 has two camming surfaces 92 and 94 which interact with camming surfaces 96 and 98, respectively, on plug door 58. Receptacle door 90 is hinged along one edge by providing posts 100 that snap into cutouts 102 in receptacle housing 70. Means (not shown), such as a spring or camming linkages molded into the part, may be used to bias door 90 in the closed position. When plug 12 is inserted into receptacle 14, forward end 52 and plug door 58 push against receptacle door 90, raising and opening it. The ramped camming surface 94 then begins to forcibly abut camming surface 98 on plug door 58, pushing door 58 to the side to reveal slots 54 and 56. If plug 12 is thereafter removed from receptacle 14, then ramped camming surface 92 similarly pushes against camming surface 96 as the plug is removed, sliding plug door 58 back into its closed position. Shroud 24 has grooves or indentations 104 and 106 to accommodate camming surfaces 92 and 94 when the plug is in the receptacle, which also serve to further stabilize the connection. Other door designs may be implemented with receptacle 14, such as a door which manually opened outward and snapped shut.

The receptacle may also have a door that acts as the latch for retaining the plug. In this alternative design (not shown), the plug body (shroud) has a notched area on its bottom side. The door in the receptacle is a rectangular, spring-loaded plate, with a tab (cantilever beam) protruding from its bottom when the door is in the closed position. When the plug is inserted into the receptacle, the door rotates from a vertical to a horizontal position. Once the plug is fully inserted, the notch clears the top edge of the door. Then the door springs back up a few degrees and bottoms out on the area in the notch. This provides the locking between the two parts. Removing the plug is accomplished by squeezing on the plug and tab portion of the door. This causes the door to return to its horizontal position and allows the plug to slide back out of the receptacle. The tab would be formed such that, when the plug is removed, there would not be enough friction to keep the finger on the tab. This construction provides for a simpler plug design.

The receptacle may further be modified with internal latches to be mounted in two different positions on the wall or bulkhead, a first position wherein it is fully operational and flush with the wall, and a second position wherein it projects slightly outward from the wall. This provides access to the interior of the receptacle for cleaning.

The plug-receptacle latching mechanism may advantageously be designed to prevent breakage of the plug assembly when the plug cable is pulled excessively, such as if someone trips over the cable. This is achieved by providing a latch geometry which allows the plug to be pulled out of the receptacle if the tension on the cable exceeds a given pull-out force. This results in the plug releasing from the receptacle rather than the cable pulling out of the plug, and this aspect is made more acceptable because of the automatic shutting of the plug door upon removal from the receptacle.

A plug-to-plug interconnection may also be provided, which utilizes two plugs of the form of plug 12 with no receptacle but, rather, with a coupling mechanism to receive both of the plugs (similar to a coupling sleeve used to interconnect ferrule-type optical connectors). The envisioned design would likely utilize an S-bend on both of the plug fibers, and a fiber stub located in the coupling mechanism, looped such that its terminal ends are adapted to abut the respective ends of the plug fibers.

All of the components of connector 10 (except plug boot 38) may be formed of any durable material, preferably an injection moldable polymer such as polycarbonate, VALOX (a polyester sold by General Electric), or RADEL (a polyarylsulfone sold by Amoco). The material may include conductive fillers to render the components semiconductive in order to minimize triboelectric charging which can induce fiber end contamination. Boot 38 is preferably formed of low modulus copolyester elastomer such as that available from RTP of Winona, Minn., under material number 1559X67420B.

Assembly and installation of connector 10 is straightforward. Plug 12 is typically assembled in the factory, although it may easily be assembled in the field. In this regard, the term "pre-terminated" as used herein simply refers to the attachment of optical fibers to plug 12 or receptacle 14 regardless of whether such attachment occurs in the factory, the field, or elsewhere. It is also understood that plug 12 or receptacle 14 could be mounted on a jumper cable or patch cord with any kind of optical connector at the other end of the fibers. It is recommended that fibers be used which have a longer life when exposed to indoor environments, such as the high-strength fibers available from Minnesota Mining and Manufacturing Co. (3M—assignee of the present invention). Those fibers have a conventional core and cladding which is surrounded by a novel three-layer construction, as discussed in U.S. Pat. No. 5,381,504. Those skilled in the art will also appreciate that the connector of the present invention can accommodate discrete optical fibers or multifiber ribbons, as well as both singlemode and multimode fibers.

Fibers which are to be pre-terminated to either plug 12 or receptacle 14 should be stripped, cleaved and cleaned. If the fibers are in the form of a ribbon which is part of a bundled group of ribbons in a cable, then a portion of the cable jacket must first be cut back to reveal the ribbons. Most cables have several protective layers, and each of these layers must be removed to provide access to the fiber ribbons. Similar steps must be taken to remove the protective layers of a cable having a single discrete fiber. After the fibers have been removed from the protective cable jacket, they are stripped. The stripped fibers are then ready for cleaving which may be accomplished using any one of several commercially available fiber cleavers, such as that shown in U.S. Pat. No. 5,024,363. The cleave length for attachment of the fibers to plug 12 is the distance from fiber holder 18 which, in the preferred embodiment, is about 23 mm. For attachment of fibers to receptacle 14, the cleave length is the distance from fiber holder 72 which, in the preferred embodiment, is about 15 mm. Any debris should be cleaned off the fibers using a lint-free cloth. Prior to removing the fibers from the cleaver, the craftsperson may inspect the fibers to confirm that the end faces on all fibers are acceptable, i.e., that they are smooth cleaves with no spikes. The fiber viewer disclosed in U.S. Pat. No. 5,210,647 may be used for this purpose. Once the craftsperson is satisfied that each of the fibers has an acceptable end face, the fibers may be removed from the cleaver. In the preferred embodiment, the fiber end faces are flat with a chamfered or beveled periphery (or at least partially beveled) to obtain the advantages associated with such a fiber end profile, as discussed more thoroughly in U.S. Pat. application Ser. No. 08/122,755. The fiber end faces may alternatively be radiused (generally spherical). The fibers may further optionally be provided with an asymmetric treatment, like cleaving so as to impart an angled end face, as taught in U.S. Pat. No. 5,048,908. If so, in order to minimize insertion losses and reflections, the fibers should be inserted so that the orientation of the angled end faces of one set of fibers (i.e., in plug 12) complements the orientation of the angled end faces of the other set of fibers (i.e., in receptacle 14). For the plug fibers, fiber preparation may be done after the fiber cable has been threaded through boot 38.

Final assembly of plug 12 comprises the simple steps of clamping the fibers in the V-grooves of holder 18 and snapping shroud 24 onto holder 18. An assembly fixture may be used to guide shroud 24 onto the plug fiber holder so as to avoid damaging the fibers as they are inserted into the shroud. The ends of the plug fibers should terminate about 0.5 mm from the end of the shroud. Completion of receptacle 14 is also simple. The receptacle fibers are clamped onto fiber holder 72 using clamping plate 80, with the ends of the receptacle fibers terminating in the fiber-alignment grooves about 15 mm from the tips of fingers 82 and 84. The receptacle fibers may be cleaved after securing them to the fiber holder. The fibers may be assembled into the holder using the V-groove to actually pick up the fiber holder from the cleaver, to avoid contamination of the fiber tips, if mating and guiding features are provided on one or both parts. A punch-down tool could also be used to simplify assembly. Fiber holder 72 is attached to housing 70, first by pushing the pivot posts into cutouts 88, and then snapping the studs into holes 89. Care should be taken during placement of the fibers in the V-grooves and attachment of the holder to the receptacle to not contaminate the fiber tips.

Installation of connector 10 is equally straightforward. Receptacle 14 is optionally mounted to any desired surface by convenient means, such as latching arms 76 (other constructions could be molded into housing 70 for custom mounting). Several receptacles could also be mounted in a single module, and they can be designed for front or rear loading, or sliding from the side. After receptacle 14 is mounted, the connection is completed by simply inserting plug 12 into opening 74. Plug 12 is released from receptacle 14 by latch 40.

FIGS. 1 and 2 depict full insertion of the plug. As plug 12 is inserted, door 90 opens and cams door 58 open as described above, allowing fingers 82 and 84 to enter slots 54 and 56 respectively. Plug fibers 30 and 32 contact the fiber-alignment grooves in fiber holder 72, and slide until their end faces abut the respective end faces of the receptacle fibers, and then become bowed when the plug is fully inserted. The plug fibers may undergo an S-shaped bend. All force at the fiber-to-fiber interface comes from the resilience (elastic deformation) of bowed fibers 30 and 32 which maintains a continuous compressive load between the ends. Connector 10 is preferably designed to maintain a minimum bend radius of 0.3" on the fibers.

The dimensions of the various components of connector 10 may vary considerably depending upon the desired application. The following approximate dimensions are considered exemplary. Plug 12 has an overall length of 57 mm, a width of 12 mm, and a thickness of 8 mm, and plug fiber holder 18 provides clamping grooves that are 13 mm long. Plug shroud 24 extends 25 mm beyond holder 18, providing an interior space which is 24 mm long, 10 mm wide and 6 mm high. Opening 74 of receptacle 14 is 12 mm×10 mm. Its overall height and depth are 38 mm and 36 mm. Receptacle fiber holder 72 is 20 mm long (from the end where the fibers are clamped to the tips of fingers 82 and 84), 12 mm wide and 1.5 mm thick. The fiber-alignment grooves in fingers 82 and 84 are 11.5 mm long and have a maximum depth of 2 mm which suitably accommodates most conventional optical fibers. The interior angle of the V-grooves should not be too narrow since this might result in excess friction with the fibers, but it also should not be too wide since this would not keep the fibers guided properly. A 90° interior angle is believed to be a good compromise.

Figure 6:
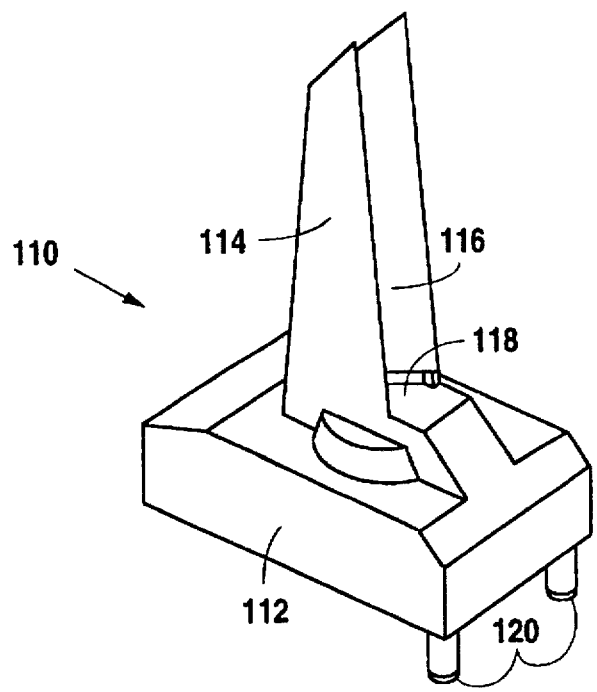
FIG. 6 is a perspective view of a termination fixture which may be used in the receptacle of the present invention.
Figure 7:
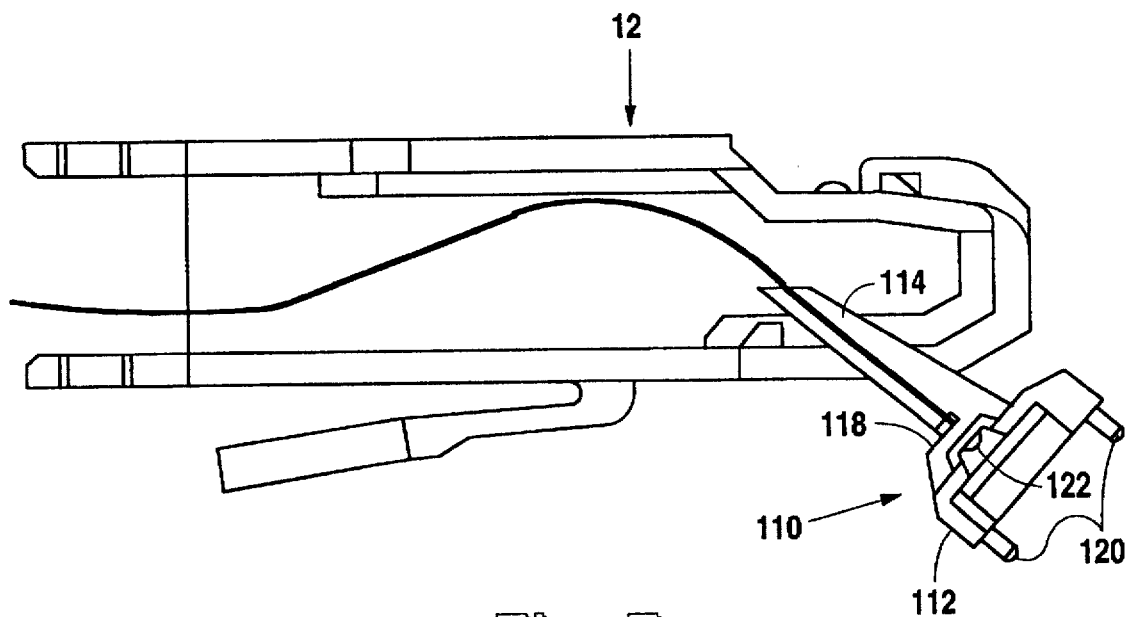
FIG. 7 is a side view of a longitudinal section of the present connector as used for termination rather than fiber-to-fiber interconnection.

The present invention is not limited to connectors for fiber-to-fiber interconnection, but also includes connectors for terminating an optical fiber, such as to an active optical device. FIG. 6 illustrates a termination fixture 110 adapted for use with an active device. Fixture 110 is essentially substituted for receptacle fiber holder 72, and has a base 112 and a projection or finger 114 similar to fingers 82, 84. finger 114 has a fiber-alignment groove 116 to receive one of the plug fibers, whose terminal end face comes to rest on a fiber stop or surface 118, as shown in FIG. 7. The material defining surface 118 is usually clear (i.e., transparent to the wavelength of light transmitted in the optical fibers), allowing the active optical device to be placed on the other side of base 112 whereby the light signal passes through the material; the material may be coated or otherwise fabricated to affect the light signal, such as controlling its intensity or polarizing it. Posts 120 formed on base 112 may be used to align and attach fixture 110 to the active device substrate, e.g., a printed circuit board (PCB). Fixture 110 preferably has a unitary construction of a clear, injection-moldable polymer such as ULTEM (a polyetherimide available from General Electric), and may further include a lens 122 formed opposite surface 118 to focus light from/to the fiber. The active optical devices and supporting structures are beyond the scope of the present invention but may include, for example, photoelectric sensors or laser diodes. Other passive optical devices (beam splitters, stub fibers in ferrules, etc.) which direct the light to or from the active devices may be employed, and different geometries of the termination fixture may be used to direct or focus light to a particular location, including geometries which employ total internal reflection (TIR). The TIR method of coupling light from a bare fiber onto a photodetector, or from a light source into a fiber, using the present invention has a number of advantages. One is the that the position of the fiber is determined by the fiber stop, allowing the plug fiber to be repeatably located in the same position. The position of the fiber end is thus predetermined by the tolerances on the molded part and the location accuracy of the active elements, i.e., the photodetector or light source, hence this obviates the need for active optical alignment. Another advantage is that, coupled with an S-bend of the fiber, the overall height of the transceiver module can be reduced. An S-bend could also be used in a connector for two parallel, but not coaxial, fibers. Finally, the transceiver electronics can be mounted on a board that lies in the same plane in which the connector is inserted.

A fiber stub may also be used in an active device termination, the stub (not shown) secured in a holder like receptacle holder 72.

Besides providing for quick and easy connection and disconnection, connector 10 has several other advantages. As previously mentioned, it may easily be pre-terminated in the field as well as the factory. Even if the fibers in either the plug or receptacle do not terminate at exactly the desired position there will still be full fiber-to-fiber contact in the completed connection since the resilient stress of the bent fibers provides a positive abutment force; in other words, the tolerance in the relative positions of a fiber pair is eased by the slack in the plug fibers. Plug 12 is also inherently pull-proof due to this biasing. Tolerances are also not critical in the transverse position of a given fiber pair since V-grooves 36 serve to align the fibers and the fibers are biased toward the apex of the grooves. The surface finish of the fiber-alignment grooves should be smooth and the groove angle be well-defined; this finish is easy to fabricate using standard injection molding techniques. The V-groove preferably has a sharpness with no more than a 0.001" radius. It is preferable to use a material for the V-groove substrate which is hard, to resist abrasion, but also having a low coefficient of friction to minimize frictional forces on the fiber as it slides in the groove. Also, since the receptacle fibers enter housing 70 at an oblique angle (up to 90°) with respect to the plug axis, it requires very little depth for mounting. Moreover, the mounting methods are compatible with those of RJ45 jacks. Finally, the reduced part count and the fact that all parts can be injection molded contribute to a very low cost connector.

Figure 8:
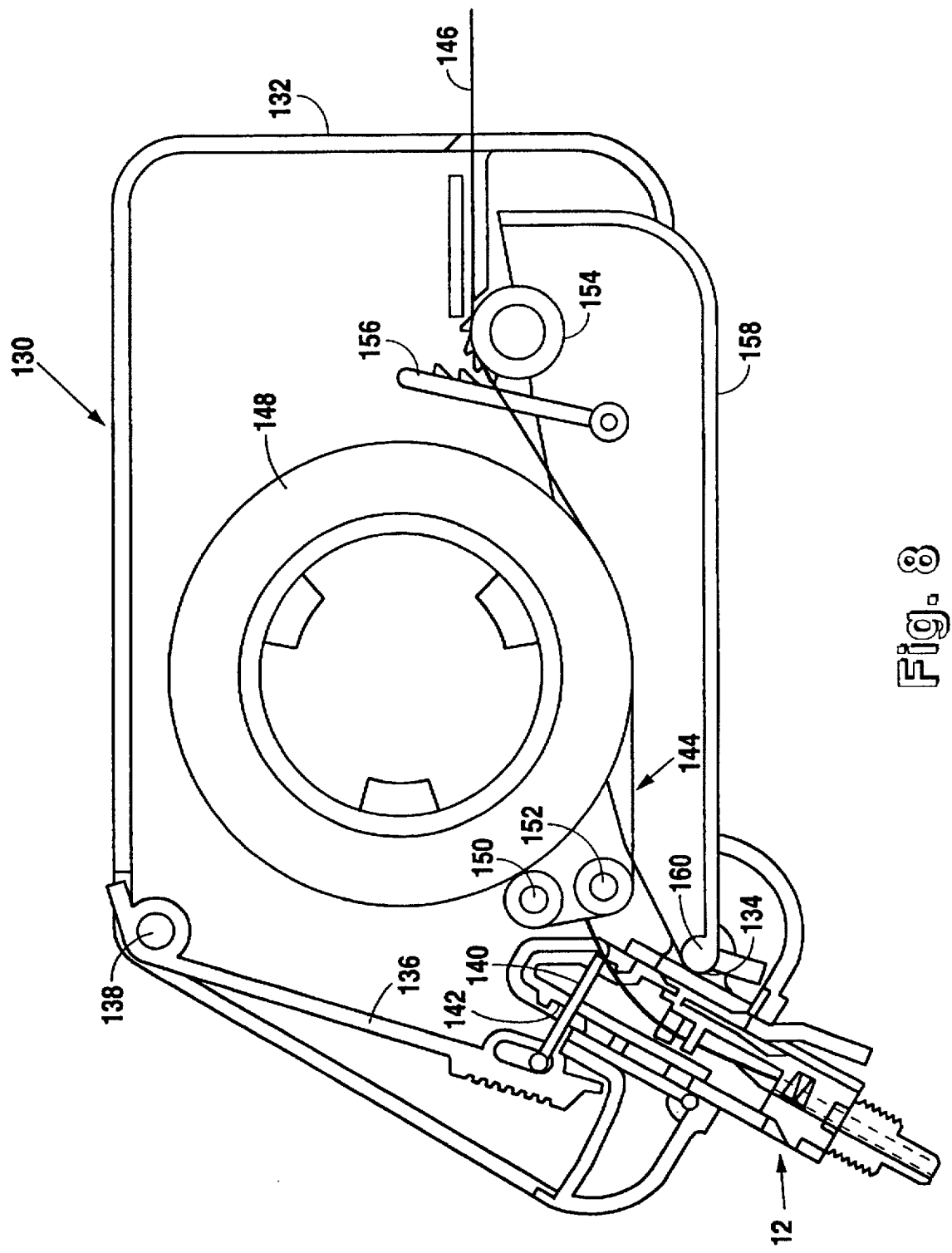
FIG. 8 is a sectional view of a tool used to clean the tips of the fibers in a plug.
Figure 9:
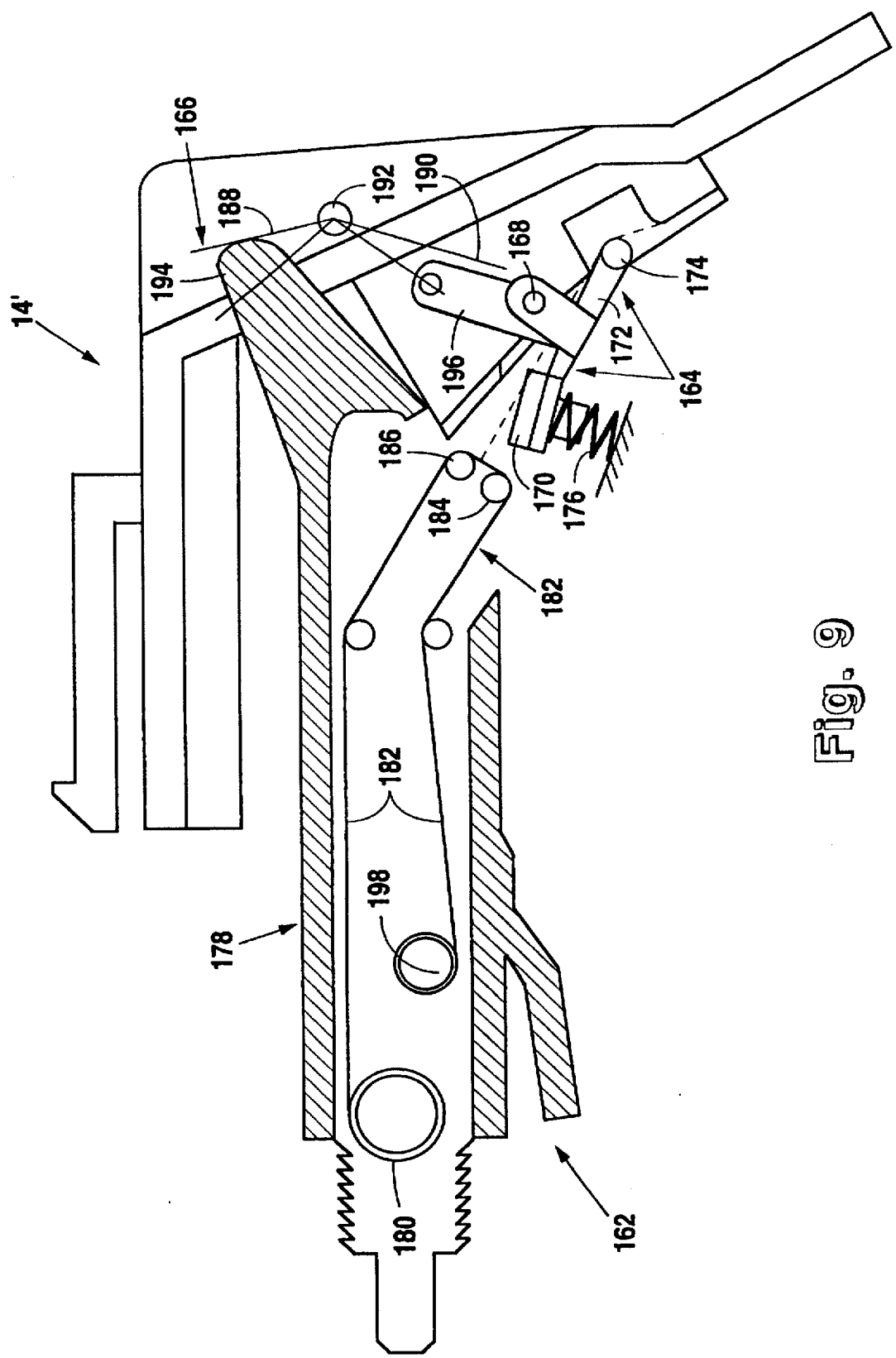
FIG. 9 is a sectional view of a tool used to clean the tips of the fibers in a receptacle.

With further reference to FIGS. 8 and 9, those figures depict tools which may be used in conjunction with the present invention, to clean the tips of the various optical fibers. FIG. 8 shows a tool 130 used to clean the tips of the fibers in plug 12. Tool 130 has a body 132 adapted to be held in the hand, with an opening 134 in body 132 for receiving plug 12. Tool 130 also has an actuation member or lever 136 pivotally attached to body 130 at 138. In FIG. 8, lever 136 is shown in the actuated position, in which state a push rod or tab 140 enters a hole or slot 142 in the top of the plug shroud, and contacts the plug fibers, forcing them out of the shroud through slots 54, 56. In the unactuated position, lever 136 swings away from opening 132 and retracts push tab 140 so that plug 12 can enter tool 130 without interfering with the push tab. Lever 136 is preferably biased toward the unactuated position by, e.g., a spring.

Opening 134 and lever 136 are located such that the plug fibers, when pushed through the shroud slots, are forcibly abutted against the adhesive side 144 of a strip of tape 146. Tape 146 is peeled away from a tape roll 148 which is stored in tool body 132. Two rollers 150 and 152 are provided to allow the tape to advance so that a fresh adhesive surface is presented to the fiber tips. To facilitate use, tape 146 may be wound about another roller 154 forming a ratchet wheel which engages a pawl 156. Pawl 156 is in turn located on another handle or pivoting lever 158 attached to tool body at 160. In this manner, the user may advance the tape and clean the plug fibers by squeezing handle 158 while holding the tool. Handle 158 may also be biased by, e.g., a spring, toward the outermost position.

FIG. 9 shows a tool 162 used to clean the tips of the fibers in a modified receptacle 14'. The shape of tool 162 is reminiscent of plug 12, whereby it is adapted to be inserted into receptacle 14' in a similar manner. Receptacle 14' is generally identical to receptacle 14, except for the provision of certain features designed to raise the receptacle fibers up out of the V-grooves for cleaning. These features include a fiber hold-down or retainer 164 and a tilt linkage 166. Fiber retainer 164 is pivotally attached to the fiber holder at 168, and includes a block or pad 170 located at one end of the retainer arm 172 adapted to push the fibers into the V-groove and keep them nested properly therein. Pad 170 may be molded into the fiber hold-down. The other end of retainer arm 172 has formed thereon a boss or button 174 which pushes against the receptacle fibers when retainer arm 172 is in the actuated position, as shown in FIG. 9. Pushing of the fibers by boss 174 causes the fibers to deflect out of the V-grooves. Fiber retainer 164 is preferably biased, e.g., by a spring 176, toward the unactuated position, i.e., pushing pad 170 against the fibers to maintain them in the V-grooves.

Tool 162 includes a body 178 which, like tool 130, also houses a supply spool 180 of adhesive tape 182. Rollers 184 and 186 serve to position tape 182 such that its adhesive side can again be advanced to clean the fiber tips. The fibers are deflected when tool 162 enters receptacle 14' by means of tilt linkage 166, which includes two tilt arms 188 and 190 fixed together at another pivot point 192. A projection or actuator bump 194 formed on the front end of tool 162 pushes against tilt arm 188 as the tool is inserted into the receptacle. This in turn causes tilt arm 190 to rotate and push against a catch or finger 196 attached to fiber retainer 164. Forcible contact between tilt arm 190 and finger 196 causes fiber retainer 164 to pivot about point 168, thereby pushing boss 174 against the fibers and deflecting them out of the V-grooves. Tape 182 in tool 162 may be taken-up on another spool 198, or exit tool body 178 in a manner similar to that shown in FIG. 8 for tool 130. A small dial or twist rod may be attached to take-up spool 198 and extend outside of body 178 to allow the user to advance the tape.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, although only two fibers pairs are shown connected in the figures, connector 10 could accommodate practically any number of fibers (or just a single pair). It is therefore contemplated that such modifications can be made without departing from the spirit or scope of the present invention as defined in the appended claims.

We claim:

1. A plug for terminating or interconnecting an optical fiber, comprising:

means for securely holding a terminal portion of the fiber;

an elongate, hollow plug body attached to said fiber holding means such that the terminal portion of the fiber extends into an interior of said plug body generally parallel to an axis of said plug body, said interior having sufficient space to allow the terminal portion of the fiber to bow within said interior, and said plug body having at least one opening providing access to the terminal portion of the fiber from an oblique angle with respect to said plug body axis;

wherein said access opening comprises a slot located at a forward end of said plug body, and further comprising a door member attached to said plug body, movable between a closed position wherein said door member covers said slot and an open position wherein said slot is unobstructed by said door member.

2. The plug of claim 1, wherein said plug body is mechanically polarized.

3. The plug of claim 1, wherein said door member slides sideways across said forward end of said plug body.

4. The plug of claim 3, wherein said door member has a camming surface adapted to urge said door member sideways upon insertion of the plug in a receptacle.

5. A plug for terminating or interconnecting an optical fiber, comprising:

means for securely holding a terminal portion of the fiber;

an elongate, hollow plug body attached to said fiber holding means such that the terminal portion of the fiber extends into an interior of said plug body generally parallel to an axis of said plug body, said interior having sufficient space to allow the terminal portion of the fiber to bow within said interior, and said plug body having at least one opening providing access to the terminal portion of the fiber from an oblique angle with respect to said plug body axis:

wherein said fiber holding means comprises;

a first block having a landing member extending in a direction toward the terminal portion of the fiber, said landing member having upstanding posts which limit skewing of the terminal portion of the fiber; and a second block positioned adjacent said first block, at least one of said first and second blocks having a fiber-receiving groove at an adjacent surface.

6. The plug of claim 5 wherein said landing member has attached thereto latch means for releasably securing said plug body to a receptacle.

7. A optical fiber termination comprising:

a plug having a plug fiber holder securing a bare, terminal portion of an optical fiber, and an elongate, hollow plug body having first and second ends, said first end being open and attached to said plug fiber holder with said terminal portion of said fiber extending into an interior of said plug body generally parallel to an axis of said plug body, said interior having sufficient space to allow said terminal portion of said fiber to bow within said interior, and said second end having a slot providing access to said terminal portion of said fiber;

a receptacle having an opening sized to receive said second end of said plug body, said receptacle further-having a projection adapted to enter said slot in said plug body, said projection having a fiber-alignment groove therein located to receive said terminal portion of said fiber when said plug body is inserted in said receptacle; and latch means for releasably securing said plug body in said receptacle.

8. The optical fiber termination of claim 7, further comprising means for biasing said plug body in an exit direction from said receptacle opening.

9. The optical fiber termination of claim 7, further comprising means for releasing said latch means when a predetermined tension is placed on said plug fiber.

10. The optical fiber termination of claim 7, further comprising a door member attached to said plug body, movable between a closed position wherein said door member covers said slot and an open position wherein said slot is unobstructed by said door member.

11. The optical fiber termination of claim 7, wherein said receptacle further has a receptacle fiber holder securing a bare, terminal portion of another optical fiber whose end face is located along an intermediate section of said fiber-alignment groove.

12. The optical fiber termination of claim 7, wherein said plug fiber holder comprises:

a first block having a landing member extending in a direction toward the terminal portion of the fiber, said landing member having upstanding posts which limit skewing of said terminal portion of said fiber; and a second block positioned adjacent said first block, at least one of said first and second blocks having a fiber-receiving groove at an adjacent surface.

13. The optical fiber termination of claim 10, wherein:

said door member slides sideways across said second end of said plug body;

said door member has a camming surface adapted to urge said door member sideways; and said receptacle has a door member having a corresponding camming surface adapted to cam against said camming surface of said plug door member upon insertion of said plug body in said receptacle.

14. The optical fiber termination of claim 11, further comprising fiber hold-down means for securely retaining said receptacle fiber in an apex of said fiber-alignment groove.

15. A fiber optic connector comprising: a plug including a plug fiber holder securing a bare, terminal portion of an optical fiber, an elongate, hollow plug shroud having first and second ends, said first end being open and attached to said plug fiber holder with said terminal portion of said fiber extending into an interior of said plug shroud generally parallel to an axis of said plug shroud, said interior having sufficient space to allow said terminal portion of said fiber to bow within said interior, and said second end having a slot providing access to said terminal portion of said fiber; and a receptacle including a receptacle housing having an opening sized to receive said second end of said plug shroud, said plug shroud further having means for releasably securing said plug shroud in said receptacle housing, a receptacle fiber holder securing a bare, terminal portion of another optical fiber, said receptacle fiber holder having a projection adapted to enter said slot in said plug shroud at an oblique angle with respect to said plug shroud axis, said projection having a fiber-alignment groove therein located to receive said terminal portion of said plug fiber when said plug shroud is inserted in said receptacle, an end face of said receptacle fiber being located along an intermediate section of said fiber-alignment groove, and means for releasably mounting said receptacle housing to a support surface;

whereby said plug fiber extends generally straight within said plug shroud when said plug is removed from said receptacle, but is sufficiently long such that when said plug is fully inserted in said receptacle, said plug fiber becomes bowed to maintain a continuous compressive load against said end face of said receptacle fiber.

16. The fiber optic connector of claim 15, wherein:

said plug further includes a plug door slidably attached to said second end of said plug shroud, having a closed position wherein said plug door covers said slot and an open position wherein said slot is unobstructed by said plug door; and said receptacle further includes a receptacle door hingedly attached to said receptacle housing at said opening, having means for urging said plug door to said open position as said second end of said plug shroud is inserted into said receptacle housing.

17. A fiber optic connector comprising: a plug including a plug fiber holder securing a terminal portion of an optical fiber, an elongate, hollow plug shroud attached to said plug fiber holder with said terminal portion of said fiber extending into an interior of said plug shroud, said plug shroud having a forward end with a slot providing access to said terminal portion of said fiber, and a plug door slidably attached to said end of said plug shroud, having a closed position wherein said plug door covers said slot and an open position wherein said slot is unobstructed by said plug door; and a receptacle including a receptacle housing having an opening sized to receive said second end of said plug shroud a receptacle having a projection adapted to enter said slot in said plug shroud, said projection having a fiber-alignment groove therein located to receive said terminal portion of said plug fiber when said plug shroud is inserted in said receptacle, and a receptacle door hingedly attached to said receptacle housing at said opening, having means for urging said plug door to said open position as said second end of said plug shroud is inserted into said receptacle housing.

18. The fiber optic connector of claim 17, wherein said plug door slides sideways across said end of said plug body;

said plug door has a camming surface adapted to urge said plug door sideways; and said receptacle door has a corresponding camming surface adapted to cam against said camming surface of said plug door upon insertion of said plug body in said receptacle.

* * * * *